July 3, 1945. W. H. KRUEGER 2,379,446
SCAFFOLDING
Filed Oct. 5, 1942 8 Sheets-Sheet 1

Wm. H. Krueger,
INVENTOR.
BY Ralph J. Barrett
ATTORNEY

Fig. 4.

July 3, 1945.  W. H. KRUEGER  2,379,446
SCAFFOLDING
Filed Oct. 5, 1942  8 Sheets-Sheet 3

FIG. 5.

Inventor
WM. H. KRUEGER.
By Ralph J. Bassett
Attorney

July 3, 1945.   W. H. KRUEGER   2,379,446
SCAFFOLDING
Filed Oct. 5, 1942   8 Sheets-Sheet 4

Wm. H. KRUEGER,
INVENTOR.
BY Ralph T. Basut
ATTORNEY

July 3, 1945.  W. H. KRUEGER  2,379,446
SCAFFOLDING
Filed Oct. 5, 1942  8 Sheets-Sheet 7

WM. H. KRUEGER
INVENTOR.

BY Ralph J. Barrett
ATTORNEY

July 3, 1945.  W. H. KRUEGER  2,379,446
SCAFFOLDING
Filed Oct. 5, 1942   8 Sheets-Sheet 8

INVENTOR.
WM. H. KRUEGER.
BY Ralph J. Bassett
ATTORNEY

Patented July 3, 1945

2,379,446

UNITED STATES PATENT OFFICE 2,379,446

SCAFFOLDING

William H. Krueger, Milwaukee, Wis., assignor, by direct and mesne assignments, to Flangelock Patents Corporation, Milwaukee, Wis., a corporation of Wisconsin Application October 5, 1942, Serial No. 460,881

13 Claims. (Cl. 304—2)

This invention relates to improvements in scaffolding and particularly to scaffolding having prefabricated sections constructed in a manner to permit convenience in transportation, assembly and storage.

One of the objects of the present invention is to provide prefabricated structural elements which are capable of assembly by use of the flange-lock shown and described in my co-pending application Serial No. 385,179, filed March 25, 1941, now Patent No. 2,297,899 granted October 6, 1942.

Another object of the present invention is to provide a structure of the type in question in which elements of angle form are utilized, the elements including off-set joints of reinforced form capable of cooperating with the flange-lock of my prior application.

Another object resides in providing a scaffolding structure in which assembly is possible from the inside of the structure as it is erected section upon section, thus materially reducing expense and labor in erecting a structure.

More specifically the invention comprehends the assembly of a scaffolding in which each section includes spaced prefabricated frames so arranged and properly spaced by cooperating parts including flange-lock devices that these sections can be assembled from the inside, each section being capable of supporting an additional or further section properly supported and assembled of similar parts and in the same manner, whereby an exceedingly rigid structure is provided not only simple in form, but simple in assembly and use and constituted by a minimum number of parts.

Other objects will more clearly hereinafter appear by reference to the accompanying drawings forming a part of the specification and wherein like characters of reference designate corresponding parts throughout the several views in which:

Fig. 40 is a side elevation partly in section and Fig. 41 is a bottom view of the stationary jack.

Fig. 42 is a side elevation and Fig. 43 is a bottom view of the caster fork.

Fig. 44 is a side elevation and Fig. 45 is a sectional bottom view of the caster wheel.

Fig. 46 is an end elevation and Fig. 47 is a side elevation of a clamp collar.

Fig. 48 is a side elevation and Fig. 49 is an end view of an axle shaft.

Fig. 50 is a front elevation; Fig. 51 is a top view and Fig. 52 is a side elevation of one of the vertical columns.

Figs. 53 and 54 are side elevations and Fig. 55 is an end view of the braces.

Fig. 56 is a front elevation; Fig. 57 is a side elevation and Fig. 58 is a rear view of one of the lateral extensions.

In carrying out the present invention the embodiment comprehends the use of structural angles because of convenience in manufacture and also because of less expense than similar structures formed of tubing. The assembly comprehends broadly, prefabricated side frames which are constructed to permit their spacing by the use of various brace elements secured at their extremities and junctions by elements of the lock-bolt type such as shown in my copending application Serial No. 385,179, filed March 25, 1941. These lock-bolts indicated by reference character A in Figures 16, 17, 18, 22, 23, 24, 28, 29 and 30 include an elongated shank with the wings $a$ forming at one extremity a T-head, a threaded extremity $b$ for the unit $c$ and the squared shank portion $d$ for the lock-nut $e$. The T-head may be modified by use of the V-shaped notches $g$ formed in the under surface of the T-head $a$ or by the use of the bevelled face $h$ as shown in Fig. 30 which facilitates insertion and removal. The modifications of the lock-bolt have been found desirable in connection with certain joints as will hereinafter be noted. It is essential in building a scaffolding of height that the bottom sections be relatively heavier than the upper sections and that the weight and strength of the parts be varied in accordance with requirements for securing essential rigidity and strength.

Figure 1:
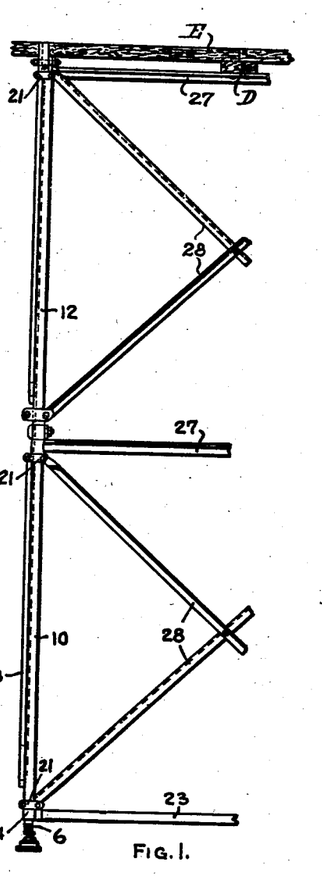
Fig. 1 is a front elevation of a part of a scaffolding constructed in accordance with the present invention.
Figure 2:
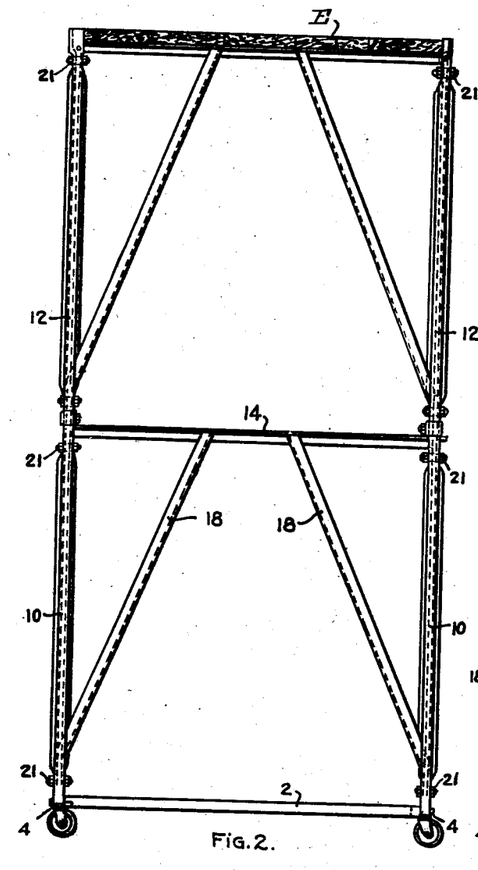
Fig. 2 is an end elevation.
Figure 3:
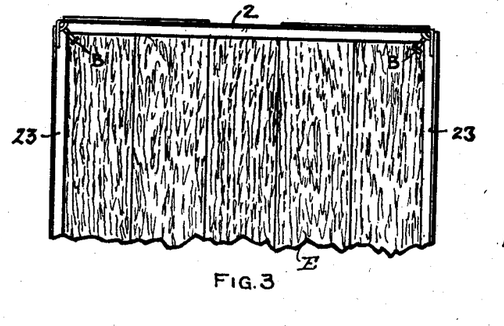
Fig. 3 is a bottom view of an end portion of the structure with the casters or jacks removed.
Figure 11:
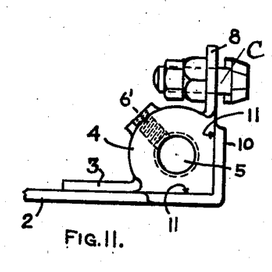
Fig. 11 is a top plan view of the base section corner.
Figure 12:
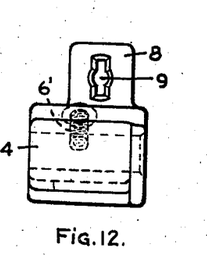
Fig. 12 is a side elevation of the disclosure of Fig. 11.
Figure 13:
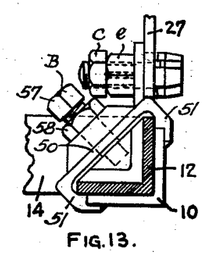
Fig. 13 is a top view.
Figure 14:
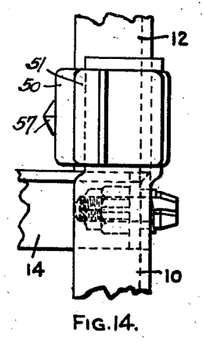
Fig. 14 is a front elevation and Fig. 15 is a side elevation of the angle lock in combination with a right angle external of the horizontal bracing member.
Figures 40, 41, 42, 43, 44, 45, 46, 47, 48, 50, 51, 52, 53, 54, 55, 56, 57, 58:
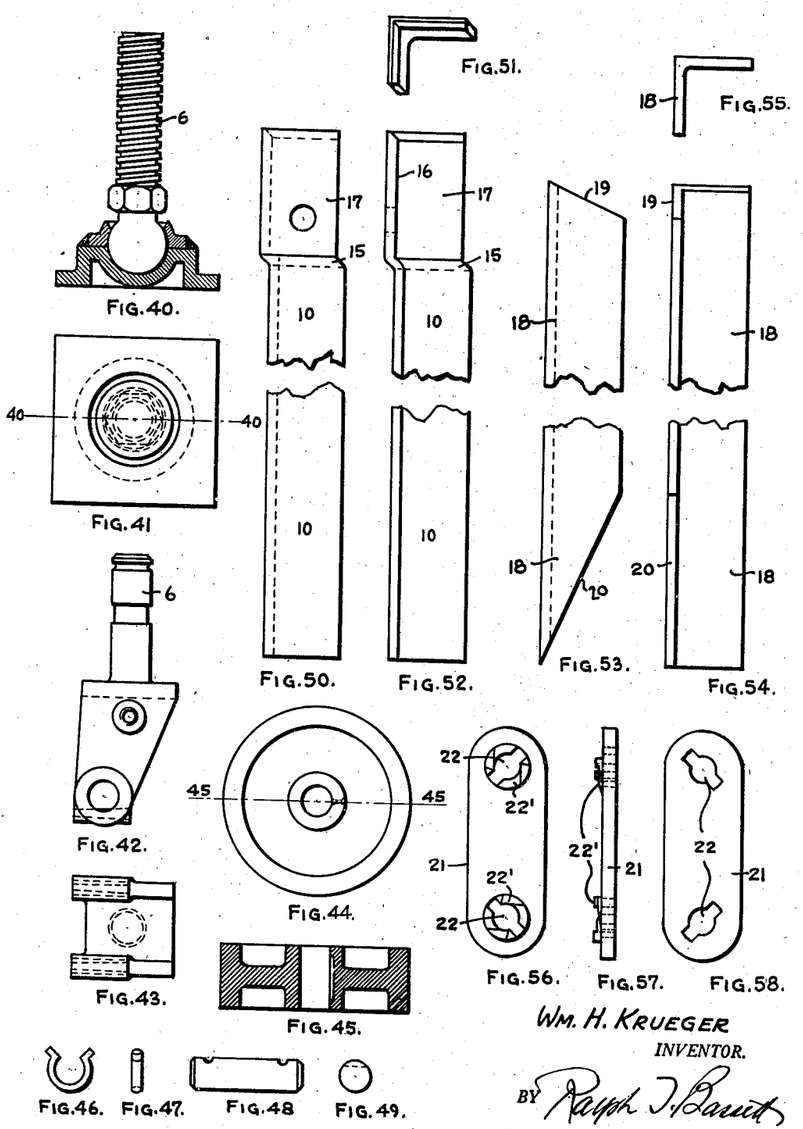

The prefabricated side sections as shown in elevation in Figs. 1 and 2 include the base-plate 2 which is welded or otherwise permanently secured to the opposite flanges 3 of the base corner sections 4, details of which are shown in Figs. 11 and 12 and include vertical openings 5 threaded to receive the shank 6 of the stationary jack shown in Figs. 1, 40 and 41 or to receive the caster shank shown in Figs. 2, 42 to 45. A lock-bolt B, (Fig. 3), may extend through the threaded opening 6' to secure the supporting part in place. It will be noted that the base corner section 4 includes the wings 3 and 8, the wing 3 being welded to the base-plate 2 and the wing 8 being formed with the key-slot 9 for the reception of the flange-lock as will be hereinafter described. Corner uprights or end posts 10 are formed of angle iron and at their lower end engage the outer faces 11 of the base corner sections 4 and are welded thereto. The lower end faces of the corner members 11, where possible, seat upon the upper faces of the base-plate 2 thus adding strength to the structure, which structure including the base corner sections 4 and base-plate 2 are preferably welded together.

Figure 7:
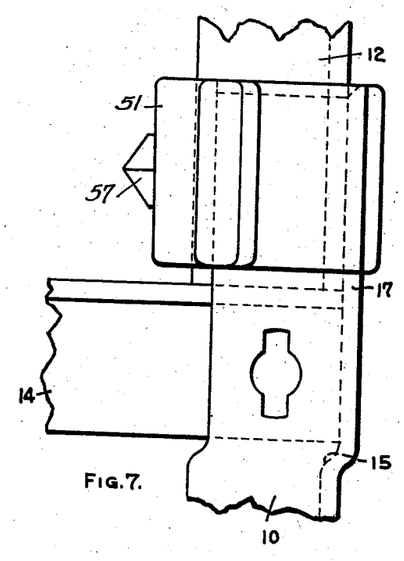
Fig. 7 is a fragmentary front elevation and Fig. 8 is a similar side elevation partly in section of the angle lock.
Figure 8:
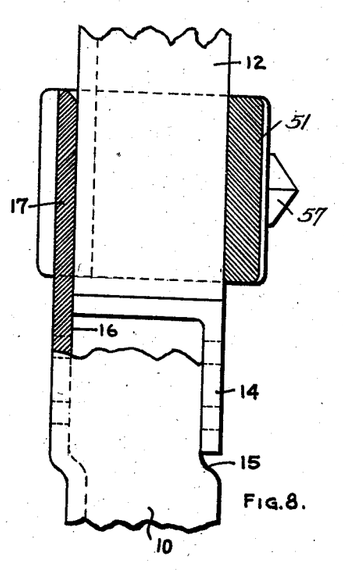
Figure 9:
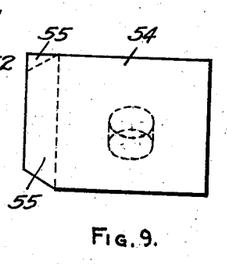
Fig. 9 is a side elevation of the locking block forming a part of the angle lock.
Figure 10:
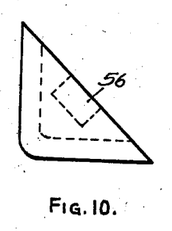
Fig. 10 is a bottom view of the locking block.
Figures 31, 32, 33, 34, 35, 36, 37, 38, 39:
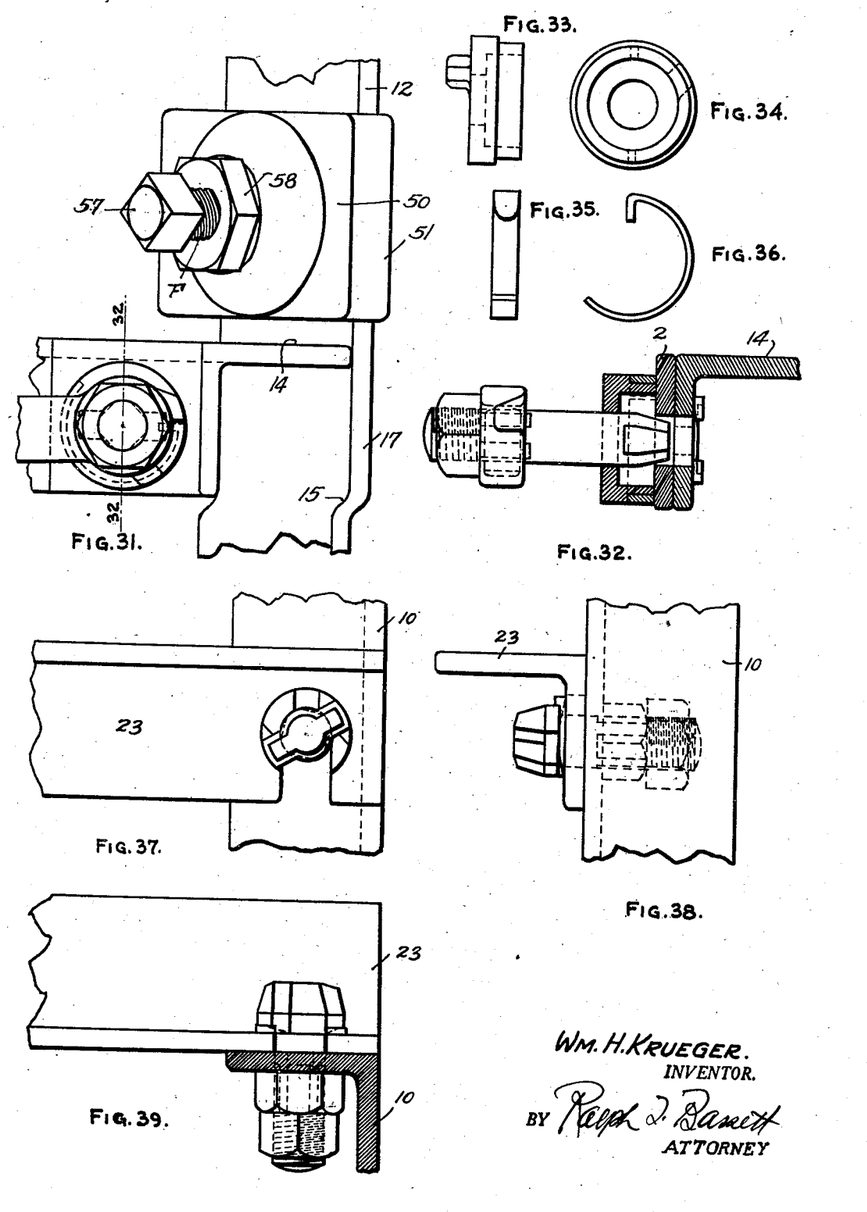
Fig. 31 is a front elevation.
Fig. 32 is a side elevation of a housing attached to a frame for receiving the wings of the flange-lock bolt when retracted.
Fig. 33 is a top view and Fig. 34 is a side elevation of the housing.
Fig. 35 is a plan view and Fig. 36 is a side elevation of a coil spring for use in connection with the housing.
Fig. 37 is a side elevation.
Fig. 38 is an end elevation and Fig. 39 is a bottom view of the locking means for securing the foot-rails to the stanchions of the platform.

The upper ends of the corner angles or posts 10 are off-set outwardly as shown more clearly at 17 in Figs. 7, 8 and 31 to receive the lower end portion of the corner angle or upright 12 of the next super-imposed section. Interposed between the upper end portions of the uprights 10 are the upper horizontal braces 14, these braces being of angle form as shown and being welded to the uprights immediately above the upper offset end portions thereof, whereby an increased supporting area is provided by the offset shoulders 15 as shown in the figures just mentioned. It will be noted that this upper horizontal brace 14 is positioned inwardly of the uprights with its upper flange extending outwardly and abutting against the inner wall 16 of the corner posts as shown in Figs. 7, 8 and 31. In Figs. 50, 51 and 52 I have illustrated in detail the structure of the upright corner posts 10 and in these figures the offset upper end portions 17 are clearly illustrated. Brace members 18 extend between the base-plate 2 and the upper horizontal braces 14, these brace members extending from a medial portion of the horizontal member 14 to engage the uprights 10 substantially above their connection with the base-plate 2 to permit connection of the uprights with additional framing members as hereinafter described. The angle braces 18 are bevelled to snugly engage the vertical flanges of the corner posts 10 and the horizontal flange of the upper horizontal brace 14 and the junction of these parts are secured preferably by a welding operation. In Figs. 53, 54 and 55 the details of these brace members can be clearly seen including the angular face 19 which abuts the horizontal web of the horizontal brace 14 and the angular face 20 which engages the flange of the corner post. The bevelling of the parts increases the area of contact and facilitates rigid connection which is essential to proper assembly. By the construction and arrangement of the brace member 18, and with particular reference to Fig. 2, it will be evident that the design of such diagonally extended braces may be adapted to intended use of particular scaffold sections. Thus, to avoid unimpeded passage of persons side by side over a sidewalk, the base scaffold section would be designed with a supplementary horizontal member and diagonal cross bracing members welded thereto, high enough above the sidewalk level to allow free passage of persons underneath the same. It will also be evident the upright, supporting columns and such bracing members would be designed of any desired necessary resisting moment, relative to the maximum loads to be carried, and to the height and consequent weight of the super-imposed portion or portions of the scaffold itself. For such use of straddling a sidewalk the base-plate 2, may be detachably connected to extensions of the base-plate corners 4, by means of flange-lock bolts, like the base-plates for front and rear sides of each section are assembled thereto, as hereinafter will be particularly described, and as is illustrated in the assembly view, Fig. 1, and in the detail views of the base section corners, Figs. 11 and 12. Additional elements of the prefabricated side frame structure are the extensions 21 shown in detail in Figs. 56, 57 and 58. These extensions are in the form of flat elongated plates which are connected intermediate their length by welding or otherwise to the corner uprights 10 and are provided at each end with key-ways 22 and cooperating wedge faces 22' for use in connection with the bolt-locks forming connecting elements for relative parts. Each of the upright corner posts is provided with a pair of these extensions 21 which are located near the top and bottom portions thereof. The foregoing description of parts and of the assembly made therefrom comprehend the permanently prefabricated side of the scaffold sections which may be stored or shipped flat, being of a character to permit their piling one on top of the other as will be apparent to one skilled in the art.

Figure 28:
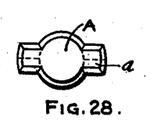
Fig. 28 is a plan view.
Figure 29:
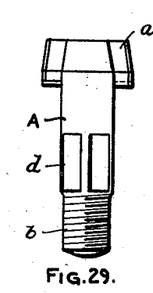
Fig. 29 is a front elevation and Fig. 30 is a side elevation of a modified flange-lock device.
Figure 30:
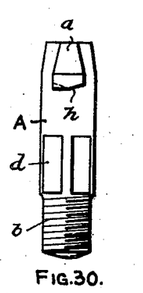
Figures 65, 66:
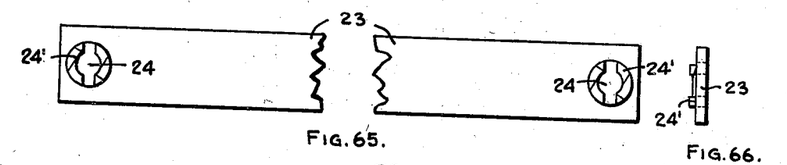
Fig. 65 is a front elevation and Fig. 66 is an end elevation of the plate for connecting the base plate corners.

Connecting the prefabricated sides are the base-plates 23, the ends of which are provided with registering key-slotted apertures 24 which are passed over the winged bolts A, Figs. 28, 29 and 30, rotatably secured in round holes extending through the flange 8 of the base corners 4. The base-plates 23 are connected to the opposite base corners of a pair of frames by means of the lock-bolt C, Fig. 11, the interior squared surface whereof cooperates with the exterior correspondingly squared surface adjacent the shank of the winged head bolt. The adjusting nut cooperates with the threaded bolt by engaging the threaded portion of the same to adjust the desired locking contact of the bottoms of the wings thereof relative to the heretofore described locking surface 24' which readily surrounds the key-slotted aperture 24 at either end of the base-plate. The base-plate indicated by reference character 23 is illustrated in Figs. 65 and 66 being of elongated form with key-slots at either end and adjacent wedge locking surfaces 24'.

Figures 15, 18:
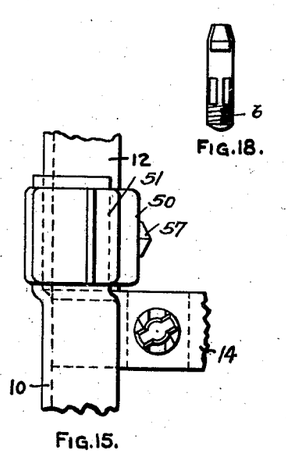
Fig. 17 is a plan view and Fig. 18 is an end elevation of the winged bolt.
Figure 16:
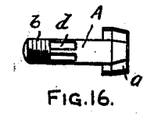
Fig. 16 is a front elevation.
Figure 17:
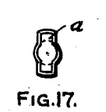
Figure 19:
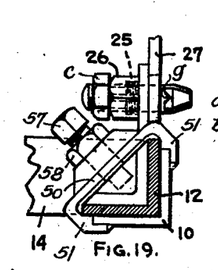
Fig. 19 is a plan view.
Figure 20:
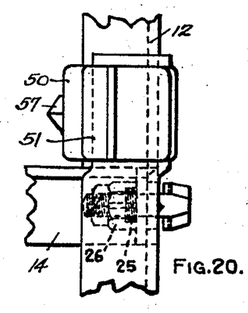
Fig. 20 is a front elevation and Fig. 21 is a side elevation of the angle lock in combination with a similarly bent extension of a horizontal bracing member.
Figure 21:
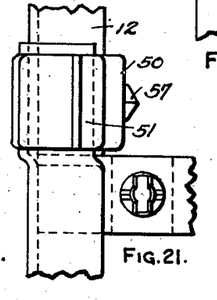
Figures 22, 23:
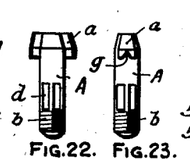
Fig. 22 is a front elevation.
Fig. 23 is a side elevation and Fig. 24 is a bottom view of a modified flange lock-bolt.
Figure 24:
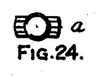
Figure 26:
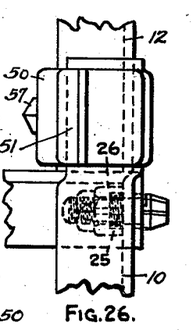
Fig. 26 is a front elevation and Fig. 27 is a side elevation of an angle lock in combination with a horizontal bracing member locked directly upon the upright column.

It is deemed that the modifications of the conventional lock-bolt, illustrated in Figs. 16, 17 and 18 will be understood without additional description. In the modifications of Figs. 19, 20 and 26, a helical spring 25 confined within a recess of the lock nut 26 would serve to hold the respective locking surfaces g and h, indicated in those views, in operative contact. Consequently, it would be necessary to pull the head of the bolt, against the force of such spring, away from such contact and then turn the head of the bolt until the nether surface of the wings a thereof lock upon the flange surface underneath.

Figure 25:
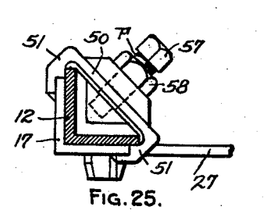
Fig. 25 is a top view.
Figure 27:
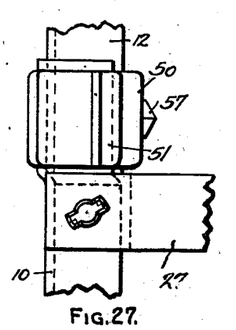
Figure 62:
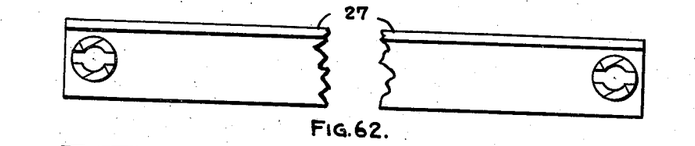
Fig. 62 is a front elevation.
Figures 63, 64:
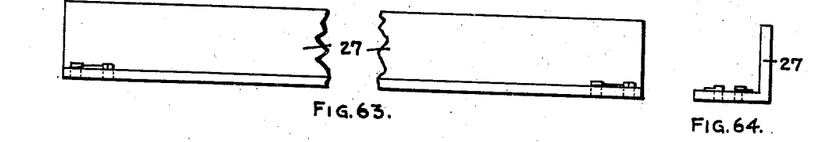
Fig. 63 is a bottom view and Fig. 64 is an end elevation of one of the horizontal members connecting the fabricated sides.

A horizontal connecting member 27, preferably of conventional right-angle cross section may be similarly secured through key-slotted holes with the flange-lock surfaces embossed on the exterior flange surfaces, on either end of such member 27, detailed in Figs. 62 through 64, to an extension of the member 14, welded to the inner surfaces of the flanges of the adjacent vertical column 10, as illustrated in Figs. 13 through 15, and 19 through 21. However, for scaffold sections which are not to be subjected to heavy loads, any suitable, horizontal connecting member 27, may be secured by means of lock-bolts the round shanks whereof are rotatably held in place within round holes through the adjacent flanges of vertical columns 10, as illustrated in Figs. 25 through 27.

Figure 5:
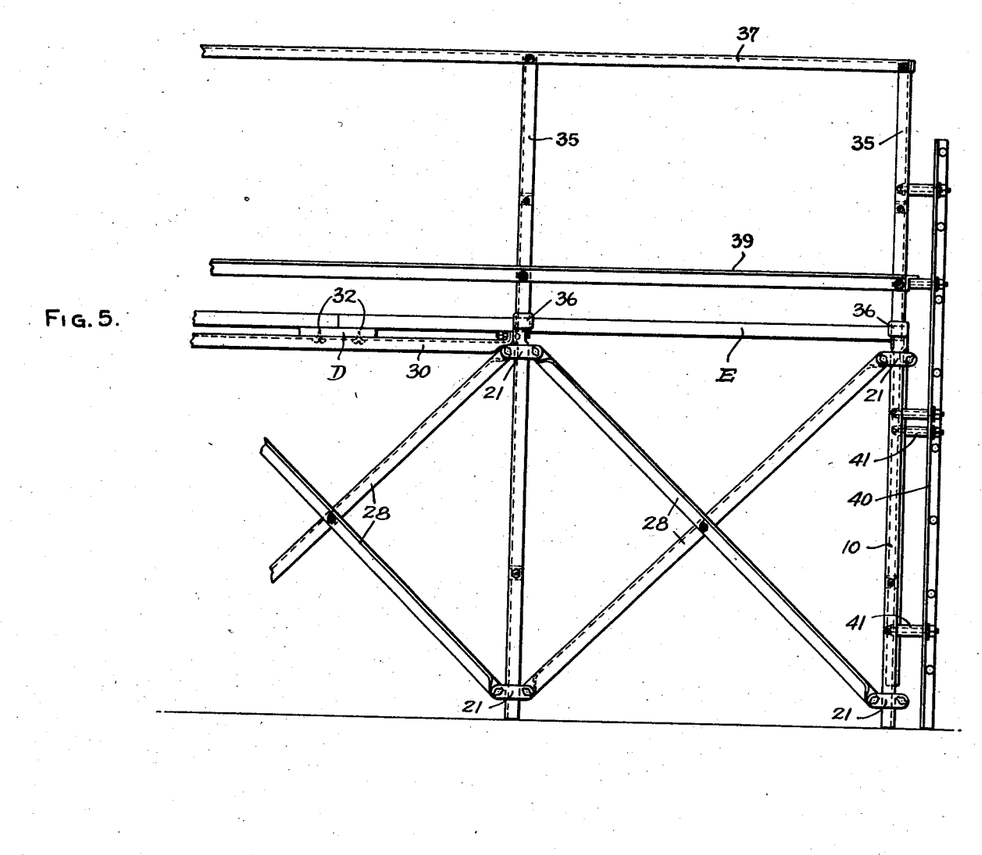
Fig. 5 is a front elevation of a scaffolding equipped with platform stanchions and hand and foot-rails secured thereto.
Figure 6:
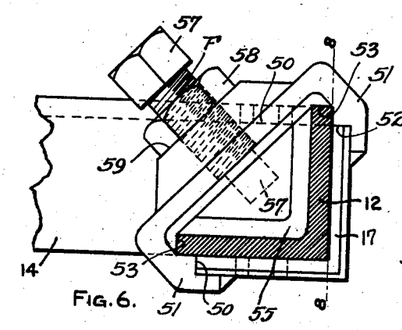
Fig. 6 is an enlarged transverse section showing the angle lock in position.
Figures 67, 68:
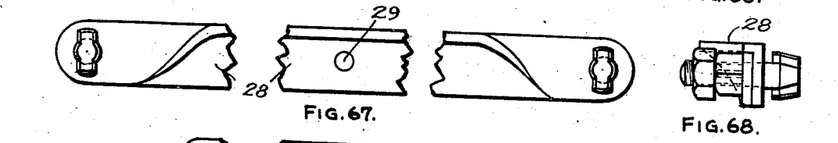
Fig. 67 is a front view.
Fig. 68 is an end view and Fig. 69 is a side elevation of the angle braces.
Figure 69:
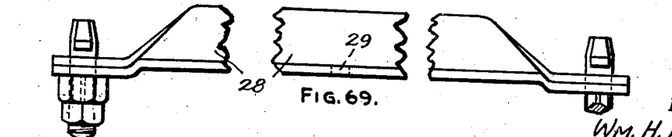

The centrally pivoted cross-braces 28, are secured at their extremities by means of suitable lock-bolts, the round shanks whereof are rotatably secured through round holes in the bent together and flattened ends. As illustrated in Figs. 67 through 69, their respective ends lie in the same plane and are designed to be joined with the ends of another similar cross-brace 28. The round shanks of the lock-bolts extend through these respective ends of both such joined braces 28. The extending flanges at right angles to the flanges at the ends thereof will then be opposite each other, offset away from the plane of their respective ends. Except at those ends the braces are not in contact with each other. These parallel flanges have registering holes 29 centrally of their length and through these registering holes they are swivelled together. When the winged heads of the bolts at either end of such joined braces 28 are passed through the registering keyslotted holes in the lateral extensions 21, those bolts may be firmly locked against the embossed surfaces on the exterior surfaces of these lateral extensions 21. It will be understood, the respective ends of such cross-braces 28, are intended to be connected between the obliquely opposite inside locking means on the lateral extensions secured to the two vertical columns of each permanently fabricated side of a scaffold section as illustrated in Fig. 1. But when such scaffold sections are set up in series, cross-braces are also applied between the obliquely opposite outside locking means on the lateral extensions 21; being those which protrude beyond each of the sections for such purpose. This is illustrated in Fig. 5. Such cross-braces 28, are shown constructed of angle shapes, which obviously afford greater resisting moment than flat bars. However, tubes, or any other shape, with flattened ends might be used.

Figure 59:
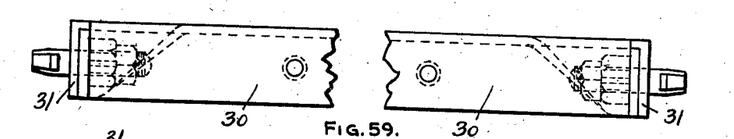
Fig. 59 is a plan view.
Figures 60, 61:
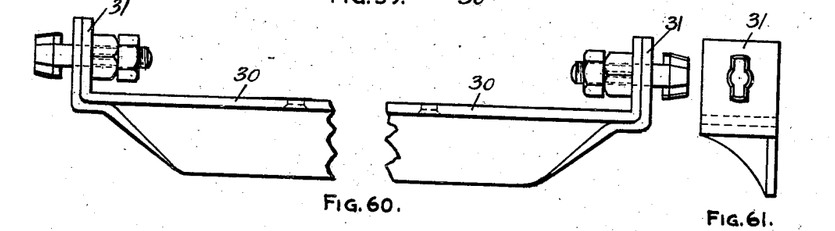
Fig. 60 is a front elevation and Fig. 61 is an end elevation of a scaffolding platform bracket.

Opposite scaffold brackets 30 are applied to the top scaffold sections for supporting a platform. Figs. 59 through 61 are detail views of such a bracket, preferably formed of an angle, the opposite ends of which likewise are bent as at 31 and flattened for connection by means of lock-bolts. The spaced platform brackets 30 are connected at either of their ends, by passing the winged heads of such lock-bolts therein through registering key-slotted holes in the parallel flanges of opposite vertical columns of such top scaffold section, or through registering key-slotted holes in the parallel flange of an extension member, welded or otherwise secured thereto for that purpose. The lock-bolts are then locked against the embossing on the exterior surface of either the vertical column, or such parallel flange of an extension member secured thereto. Another platform bracket 30 is similarly secured between the opposite two vertical columns on the other side of such top scaffold section.

Figure 4:
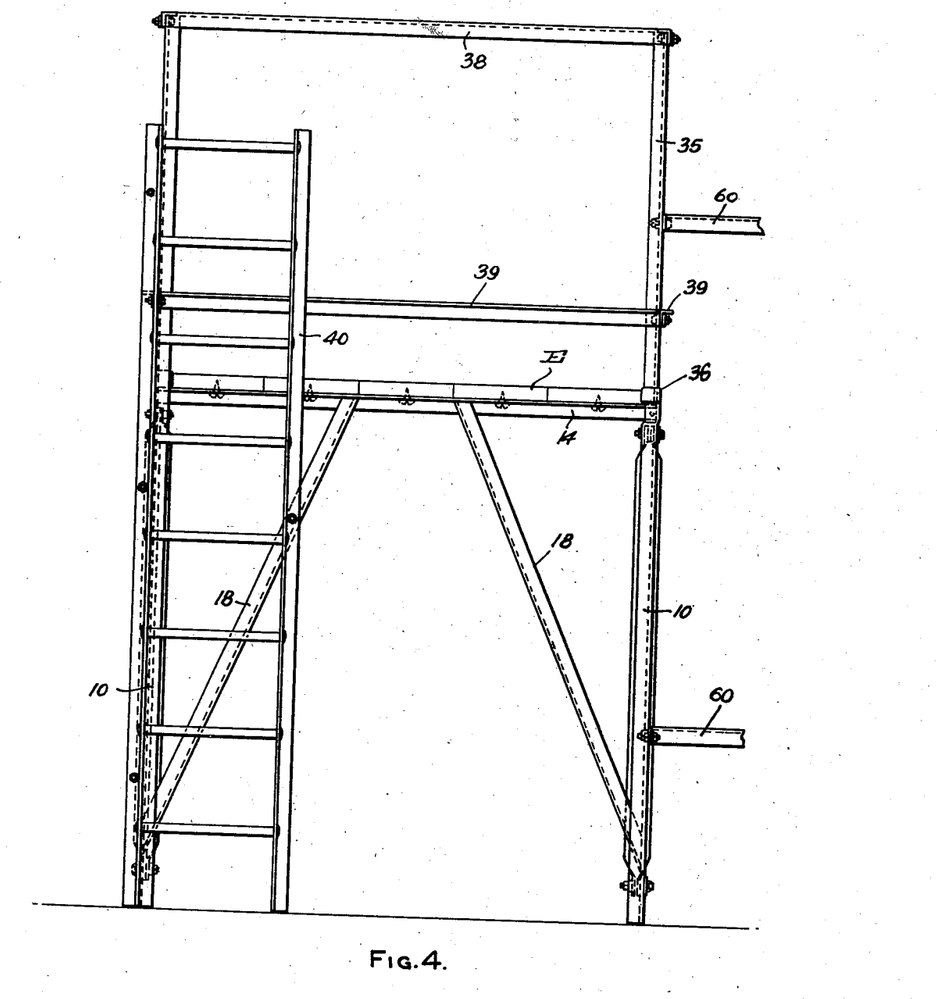
Fig. 4 is an end elevation.

Then a girder plank D of suitable thickness is laid centrally of the length of such brackets 30, extending across the horizontal flanges thereof. Such plank may be fastened to the flanges by means of wood screws 32, passed through holes therein. Other platform planks E are then laid across the top horizontal flanges 14, which have been welded or otherwise secured near the top ends of the opposite vertical members of the permanently prefabricated sides of the top scaffold sections. The girder plank D is of suitable thickness to furnish support for the plank platform E at the center. The platform planks E, extending across and on top of the girder plank D may also be secured to the transverse bearing members 14 by wood screws, or other means passed through suitable holes in the horizontal flange of said bearing members 14, across which such platform planks are laid. This is illustrated in Figs. 4 and 5. Thus a level, very secure platform is afforded for workmen on such a scaffold.

To insure their further safety, and referring to Figs. 4 and 5, hand and foot-rails may be secured to stanchions 35, which are secured within the angle-locking means 36, welded about the top outside lateral surfaces of the offset portions of the vertical columns which extend through the corners of such a plank platform. The hand-rails 37, are secured over the tops of the stanchion members 35, and to the outside lateral sides thereof by means of lock-bolts, spaced in the vertical flanges of such hand-rails 37. The winged heads of such lock-bolts, when passed through registering key-slotted holes in the adjacent flange of stanchions 35, are then locked upon the appropriate locking surfaces, embossed upon the inside surface of such flanges around each of these key-slotted holes therein. Similar hand-rail members 38, the ends of which are cut to furnish a matched corner joint with the adjacent parts of the rail members 37 are welded to the tops of the opposite corner stanchions 35, for the permanently prefabricated sides of the railings. The foot-rail 39 preferably is likewise welded to such corner stanchions 35 on these permanently prefabricated sides or ends of the scaffolding. However, the adjacent foot-rails 39' are secured near the bottoms of such stanchions on the front and rear sides of such a scaffolding by means of lock-bolts rotatably carried in properly spaced round holes in the vertical flange thereof. The winged heads of those bolts when passed through registering key-slotted holes near the bottom in the adjacent parallel flanges of the stanchions, may be locked against the generic flange-lock surfaces embossed on the inside surfaces of such flanges, around such key-slotted holes therethrough.

A ladder 40 is secured to the one or both ends of the scaffolding by means of spacer tubes 41 through which extends the round shank of a lock-bolt of suitable length. The extending flanges of the sides of such ladder 40 are provided with properly spaced, round holes which carry therein the rotatable round shanks of such long lock-bolts. The ladder is secured by passing the winged heads of the lock-bolts through registering key-slotted apertures in the exterior flange surfaces of the stanchions 35, and the vertical columns 10. Thereupon by turning the lock nut near the opposite end of such bolt, the ladder 40 is secured to the end of the scaffolding as illustrated in Figs. 4 and 5.

Reference will now be had to the angle locking device shown in detail in Figs. 6, 7, 8, 9 and 10. This angle locking device embodies two elements, the first an angular clamp shown in top plan view in Fig. 6 and second, a filler block shown in detail in Figs. 9 and 10. The angular clamp includes a body element 50 adapted to extend diagonally across the edges of the flanges of the angle member 12 and having outwardly and inwardly projecting arms 51 notched at 52 to abut against the end faces of the outer angle support 17. The angle member 50 is further provided with flat faces 53 which neatly abut against the edge portions of the flanges of the upright 12. The filler block 54 is of triangular form bevelled at one edge 55 to facilitate the insertion and recessed at 56 to receive the reduced end 57 of the bolt F. By reference to Figs. 6 to 10 inclusive, it will be seen that the angle member 50 embraces the end portions of the overlapping angle uprights. The filler block 54 is slid into position so that the socket 56 is aligned with the opening receiving the bolt F, the latter extending medially through an opening for this purpose in the clamp body 50. The bolt F is then shoved home by the use of a wrench on the head 57 and the lock nut 58 is then seated against the flat face 59 of the clamp to lock the parts in rigid position. The use of this clamp need not be limited to the connection between the uprights or standards although in the present instance they are designed primarily for this purpose by the offsetting of portions of the uprights or stanchions to facilitate inter-locking of the adjacent ends. In the construction of the present assembly the angle lock member 50 has its extremities welded to the outer offset end portion 17 of the upright 10 so that the angle lock with the exception of the filler block 54 is in fact an integral part of the prefabricated frame. The filler block may if desired be swivelled on the end of the bolt F and thus carried as a part of the structure.

From the foregoing it will be seen that the prefabricated end assembly embodies the uprights, the base frame member, the upper frame member, the braces, the lower base section corner 4 and the upper corner lock of Figs. 6 to 10. This integral structure embodying these parts comprehends the essential elements of a frame representing the main elements of a scaffold. The parts are so constructed and arranged as to facilitate quick assembly of related parts from the inside of the scaffold and during erection.

It is the intention that a standard scaffold will be sold with a suitable number of pairs of prefabricated end frames each constructed of the parts above mentioned. The number of pairs of prefabricated end frames will be determined by the height of the intended scaffold and the relative weight of these frames may be varied in accordance with good construction methods. With the prefabricated end sections will be furnished a suitable number of cross-braces 26 and upper and lower braces 23 and 27. Also will be furnished the guard rails formed of the parts 35 to 39 inclusive together with a ladder 40 of suitable height and attaching parts therefor. Connecting angles 60 may be attached to the inner uprights of the scaffolding and to such framing as may be available. The use of the connection 60 will be determined by circumstances including the height of the scaffolding and its location. Many details of the present structure, such as the lock ring shown in Figs. 35 and 36 for securing the head of the retracted bolt against rotation are of minor importance. Likewise the use of the lock rings, Figs. 46 and 47, for engaging the end notches of the axle in Fig. 48 for the jack wheel in Fig. 45 merely constitute a detail which is subject to variation in construction. The substance of the invention resides in the normal construction and arrangement of the scaffolding and the parts constituting the same.

What I claim is:

1. In a scaffold comprising prefabricated end frame members, each end frame member including spaced uprights having offset portions and a horizontal connecting element positioned at the upper end portions of said uprights, brace members connecting the horizontal member at each side of its center portion with the lower end portions of the uprights, side members connecting and bracing the end members, a superimposed frame adapted to be connected to the upper end of said uprights, and means for locking the superimposed frame member to said uprights including sockets formed at the upper ends of said uprights, said sockets including the offset wall portions of said uprights, a connecting member extending across said offset wall portions, and an adjustable filler block and locking means for said block.

2. In a scaffold comprising prefabricated end frame members, each end frame member including spaced uprights having offset upper end portions and a horizontal connecting element positioned at the upper end portions of said uprights, brace members connecting the horizontal member at each side of its center portion with the lower end portions of the uprights, side members connecting and bracing the end members, a superimposed frame adapted to be connected to the upper end of said uprights, and means for locking the superimposed frame member to said uprights including sockets formed at the upper ends of said uprights, said sockets including the offset upper end portions of said uprights, a connecting member extending across said offset wall portions, a filler block, and second means for adjusting said filler block transversely of said socket.

3. In a scaffold comprising prefabricated end frame members, each end frame member including spaced uprights having a shoulder formed by offset wall portions at their upper ends and a horizontal connecting element positioned at the upper end portions of said uprights, brace members connecting the horizontal member at each side of its center portion with the lower end portions of the uprights, side members connecting and bracing the end members, a superimposed frame adapted to be connected to the upper end of said uprights, and means for locking the superimposed member to said uprights including sockets formed at the upper ends of said uprights, said sockets including the offset upper end portions of said uprights, a connecting member extending diagonally across said offset wall portions, a filler block arranged between said walls and connecting member, and means adjustably movable through the connecting member for urging the filled block laterally in the socket.

4. A scaffolding comprising a plurality of superimposed sections, each section being prefabricated and including corner angle uprights and connecting brace members, the upper end portions of said uprights being offset to form a supporting shoulder for the lower end of the adjacent upright and the walls of said uprights above said offset shoulders forming walls of a triangular socket the third wall of which is formed by a member connecting the extremities of said walls, and means arranged in said socket for clamping the lower portions of the adjacent superimposed sections, said means including a block of irregular cross section, and an adjusting screw extending through the member connecting the extremities of said walls.

5. A scaffolding comprising a plurality of superimposed sections, each section including corner angle uprights, the upper end portions of said uprights being offset to form a supporting shoulder for the lower end of the adjacent upright and the walls of said uprights above said offset shoulders forming walls of a triangular socket the third wall of which is formed by a member connecting the extremities of said walls, and means arranged in said socket for clamping the lower portions of the adjacent superimposed sections, said means including a block of triangular cross section, and an adjusting screw extending through the member connecting the extremities of said walls.

6. In a scaffold comprising prefabricated end frame members, each end frame member including spaced uprights and a horizontal connecting element arranged at the upper end portions of said uprights, base corner sections carried at the lower portion of said uprights, said base corner sections including extensions forming connecting elements a superimposed frame adapted to be located at the upper end portions of said uprights, and means for locking the superimposed members to said uprights including sockets formed at the upper ends of said uprights for receiving depending portions of said superimposed frame, said sockets including radiating upper end portions of said upright, a connecting member extending across the outer ends of said radiating portion, filler block, and means for adjusting said filler block in said socket.

7. A scaffolding comprising a plurality of super-imposed sections, each section including corner angle uprights, the upper end portions of said uprights being offset to form a supporting shoulder for the lower end of the adjacent upright and the walls of said uprights above said offset shoulders forming walls of a triangular socket the third wall of which is formed by a member connecting the extremities of said walls, and means arranged in said socket for clamping the lower portions of the adjacent super-imposed sections.

8. A corner joint for scaffolding having overlapping connecting members, said joint comprising a socket formed by the walls of one of the connecting members, a cross member spaced from and connecting said walls, a block arranged in said socket, said block being of a dimension to permit the insertion of the second connecting member and being formed with a recess of a depth greater than the thickness of the second member, and an adjustable element extending through said wall and into said socket for urging said block into clamping position.

9. In a scaffolding, a base frame comprising prefabricated end sections each including corner uprights, an upper horizontal brace member and angularly arranged brace elements extending upwardly in spaced relation between said corner uprights and said horizontal brace and arranged in spaced relation to permit passage therebetween, said corner uprights having offset upper end portions, said offset end portions forming walls of sockets and said sockets being completed by cross elements extending between spaced portions of the offset portions of the upright, brace elements spacing and connecting end portions of the prefabricated end sections, a pair of platform brackets detachably connected to and interposed between spaced pairs of corner uprights, said brackets including angle members having vertically extending end portions formed with bolt openings for the reception of bolts, said bolts extending into said corner uprights, a platform support extending medially between said spaced platform brackets and being supported thereby, and platform elements extending from said support to the horizontal braces of the spaced end frames.

10. A scaffolding comprising a plurality of spaced rigid prefabricated frames being arranged in parallel relation and of uniform dimension, said frames forming end sections and intermediate brace sections, a pair of centrally pivoted cross members extending between the diagonal corners of each pair of prefabricated frames, horizontal braces for said frames, means for detachably connecting the cross braces and horizontal braces to said frames, and sockets formed at the upper portions of said frames for receiving a superimposed structure.

11. The substance of claim 10 characterized in that each prefabricated frame includes uprights which are formed with integral sockets aligned with said uprights.

12. The substance of claim 10 characterized in that the prefabricated frames each include uprights having at their end portions integral sockets in which are positioned adjustable wedge block members.

13. A socket for joining the overlapping ends of two angle bars, said socket being formed by offsetting the end portion of the first angle bar to an extent sufficient to receive the second bar in alinement therewith, a cross member connecting the outer edges of the offset portions of said first bar, said cross member having faces snugly engaging the longitudinal edge portions of the second angle member, and means carried by said cross member for clamping the overlying portions of the angle members together.

WILLIAM H. KRUEGER.